I. REYNOLDS.
Grain Drill.

No. 8,790.  Patented Mar. 9, 1852.

UNITED STATES PATENT OFFICE.

IRA REYNOLDS, OF REPUBLIC, OHIO.

SEED-PLANTER.

Specification of Letters Patent No. 8,790, dated March 9, 1852.

*To all whom it may concern:*

Be it known that I, IRA REYNOLDS, of Republic, in the county of Seneca and State of Ohio, have invented a new and Improved Mode of Constructing the Seeding Apparatus of Grain-Drills; and I do hereby declare that the following is a full and exact description thereof, reference being had to the accompanying drawings and to the letters of reference marked thereon, the same letters referring to the same parts.

The nature of my invention, consists in a peculiar form of grain cylinder, and box, for conducting the grain into the teeth of the machine, also, the arrangement of a multiplying wheel, or hub, upon each end of the axletree for regulating the quantity of grain, desired to be sown, also the general arrangement of the several parts, to effect these ends, but in order to enable others to make and use my invention I will proceed to describe its construction and operation.

Figure 1:
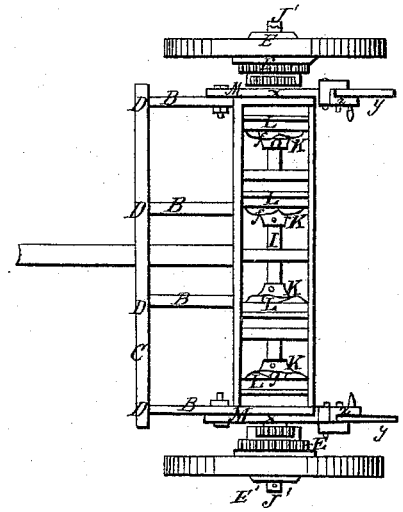
Figure 2:
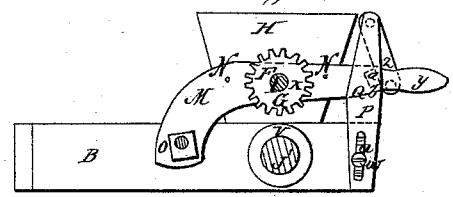
Figure 7:
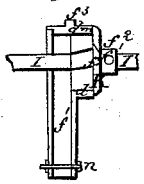
Figure 8:
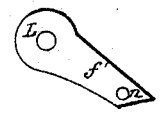
Figure 3:
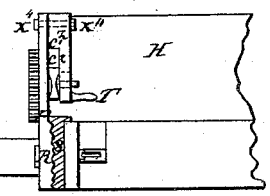
Figure 4:
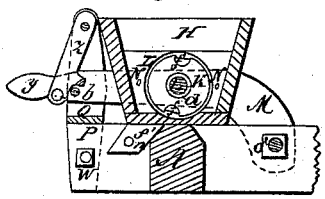
Figure 5:
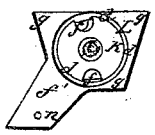
Figure 6:
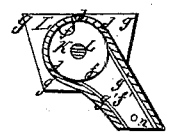

Figure 1, is a plan or top view of the machine showing the interior of the hopper; grain cylinders, cylinder shaft, wheels, frame work and multiplying wheel or hub. Fig. 2, is an end view of the hopper, and frame work, and shows the position of the pinion, revolving lever, washer, etc. Fig. 3, is a sectional rear view of the hopper, axletree, &c., showing the adjustive principles of the regulator, latch, and slot for the lever. Fig. 4, is a transverse section through the hopper, showing the revolving lever, end of grain cylinder, and cylinder box, spout and fastenings. Fig. 5, is a side view of the grain cylinder box and spout. Fig. 6, is a transverse section of Fig. 5. Fig. 7, is a vertical section of grain cylinder, box, and pinion shaft showing the several fastenings of the same. Fig. 8, is a section of the box and spout.

The axletree A, Fig. 4, longitudinal pieces B, B, B, B, and cross piece C, Fig. 1, are made of wood, of sufficient size to secure the desired strength, the axletree is beveled off on each side, as seen at A, Fig. 4, so as to admit the grain cylinder box to pass it near the center, the longitudinal pieces B, B, B, B, are halved on to the axletree, and run back and forward sufficient to form a support and bearing for any arrangement which may be desired for the teeth, and are tenanted into the cross piece C, at D.

The arm J, of the axletree, Fig. 3, is from 6 to 7 inches long and may be made in different ways, as for instance the drawings represent it in its cheapest form, made entirely of wood, this will perhaps be sufficient, as the inside of the hub or wheel E Fig. 1, is large and bored out so as to form a complete smooth surface, and is in fact equivalent to a pipe box of the same length, (among machinists, I believe it has been conceded that wood and iron are preferable if the friction is not too great) but should this be found insufficient, it may be made as above with a common cast box fitted on to the outer end of the arm of the axletree at J', Fig. 3, which would be the point on which the greatest pressure would come, or should this be found inadequate, there may be a pipe box made the whole length of the multiplying hub or wheel, and when turned smooth, driven on to the axletree, thus forming a complete box and journal on which the wheel bears; in either of the last named forms, it will be necessary to insert into the end of the axletree a screw bolt, for a cap, to hold the wheel to its place.

The hub E is cast with a series of cog work, upon the back end, or the hub and wheel may be cast separate and united by bolts or otherwise but in either case the series of cog work, is so constructed, that each of the several wheels increases in regular ratio from the smallest to the largest as for instance the smallest of the several wheels, will sow one bushel of wheat or other grain per acre, the second wheel, one and one fourth bushels per acre, and so on, increasing one fourth or any greater, or less quantity, to each successive wheel. The cogs or teeth of each of these several wheels being the same size admits of pinion F (which is attached to the grain cylinder shaft at G Fig. 2,) working in either of the several sizes of the multiplying wheel or hub, so that the changes are made arithmetically.

The pinion F, pinion and grain cylinder shaft, I, grain cylinder K, and cylinder box, L, being all attached to the hopper H, are secured to a cast iron revolving lever M, at N, which turns upon a point at $O^2$, where it is attached to the frame work by a strong bolt, and rests upon a slotted adjustable regulator P at Q, This regulator is made of cast iron with steps on notches as seen in Fig. 3 at R, which are of equal size to one half of the difference in the diameter existing between the first and second wheels, upon the hub, and fit into another cast iron plate S, equally notched and secured to the frame work as seen in Fig. 3. This regulator is slotted as seen at u, Fig. 2, so that it will adjust, and leave the inside plate and bolt in the same position. There are washers upon the back end of the hub seen at V Fig. 2 of equal length, to the length of the cogs, of the several wheels upon the hub, which can be removed at pleasure. Now supposing the farmer wishes to change the quantity of grain from one, to one and one fourth bushels per acre, the operation is simply to loosen the bolts W Fig. 2 which hold the regulators P, move the regulators up one notch, and secure them as before. Then remove one of the washers from the back end of the hub on either side of the machine, and place them upon the front end of the hub, and the change is made, positive.

The revolving lever M is cast with a knob, $b$, on the inside on which the latch rests, forms a box, for the pinion shaft, which passes through it at $x$, Fig. 2, it also constitutes part of the arrangement whereby the machine is regulated as to quantity of grain, forms a fastening for the hopper, in which particular I contemplate some variation as for instance, to cast flanges on the inside of said lever, of exact proportions desired for the hopper, so that it will fit the inside of said flanges, thus forming a support on the outside of the hopper, in which case a very slight fastening (if any) will be sufficient, as it will appear evident from the manner of arrangement that the weight of the hopper and grain, grain cylinders and boxes, pinion and grain cylinder shaft, which passes through it, will have a tendency to hold it in place. It also forms a handle $y$, for the operator to adjust the machine, and throw it out of gear, as follows, the forward end of the lever turning upon a point at $O^2$, the operator takes hold of the handle $y$, removes the latch $z$, and raises the lever so that the knob $b$ on the inside will come above the catch $a$, on the latch, which holds it until desired to be thrown into gear again, which is done by reversing the motion of the lever.

The latch $z$, is made of cast iron with a knob or catch $a$, on the inside which falls over the knob $b$, on the lever and holds it down, it also holds it up when the machine is thrown out of gear, it is also cast with a protuberance $c'$ Fig. 3, of sufficient size to form a slot $c^2$ Fig. 3 for the revolving lever, and is secured to the regulator by a bolt $x^4$ Fig. 3, it also has a handle I, Fig. 3 cast on the opposite side from said protuberance for the convenience of the operator in raising it, to adjust the machine, the above named protuberance, may be formed on the regulator P, at $c'$ Fig. 3, where I contemplate fastening a light spring to hold the latch in place, should it be found necessary.

The grain cylinder, $k$, and box L, forming a chamber and conductor $f'$ for the grain, is made of cast iron, the former is about $2\frac{1}{4}$ inches in diameter by $1\frac{1}{2}$ inches long, and is cast with 1, 2, or more grooves in its sides, of sufficient size to admit the desired quantity of grain, to pass through, the front or feeding ends of the cylinders run in the grain, and are curved where the grooves enter the grain, like the lip of a pod bit, and are fitted closely to the inside of the box L so as to force the grain through the grooves into the chamber, and spout which conducts it into the teeth, the grooves may be made straight from the back part of the lip or feeder, or they may be slightly curved from a right angle with the face of the cylinder. There is a hole cast for the shaft I, and a projection $f^2$ for securing it to the shaft, as seen at $f^4$ Fig. 7, there is a flange or shoulder also projecting out from the main part of the cylinder, which forms part of the lip or feeder $f$, which sets up against the box and prevents any grain from passing that is not forced through by the lip or bit, as seen at $m$ in Fig. 7.

The cylinder box L, is cast in 2 pieces, the main part of the box, Fig. 6, is cast with a flange $g$, $g$, $g$, which is intended to fit the inside of the hopper, and form a part of the divisions between the several apartments of the hopper, the upper portion of this flange may be dispensed with by cutting the divisions of the hopper in a circle so as to fit the circular portion of the box, say half way down the circular portion $d$, $d$, $d$, which forms the box for the cylinder.

$f'$ is the spout to conduct the grain from the cylinder chamber at K, Fig. 6,—$n$ is a fastening for the conductor to convey the grain into the teeth, $g'$ $g'$ Fig. 6, shows a rabbet for the reception of the plate Fig. 8 which forms part of the chamber and spout.

The cylinder box is held together by the bolt $n$, and firmly inserting it through the bottom of the hopper as seen in Fig. 4, and is held in place by securing the divisions of the hopper firmly on the top of the flange or circular portion. In order to give a clear view of this part of the machine I have attached a section of the cylinder, shaft, and box, of which Figs. 5, 6, 7, and 8 are drawings, Fig. 7, giving a clear view of the interior of the box, chamber and spout, cylinder shaft, cylinder, and groove, lip, or bit, for feeding, and the fastening of the cylinder on the shaft.

It will be perceived that the same general arrangement may be applied to an iron axletree, by bolting the frame work B, to the axletree. The washers V, Fig. 2, may also be dispensed with by making the pinion E, Fig. 2, to slide on the shaft, securing it by means of a pin (or otherwise) through the pinion and shaft, and so arranging the fastening, that it will be moved the length of the cogs, of each of the several wheels upon the hub, at each successive change or alteration.

The hopper H, is made quite deep and narrow at the bottom, and perhaps would be better to be made so that the circular portion of the grain cylinder box would fill the entire space, thus dispensing with the flanges g, g, g.

The wheels, tongue, and teeth may be made in any of the forms in general use, the teeth being arranged to rise and fall to suit the surface on which it runs. The grain cylinder boxes, are arranged so that they may be set backward, or forward, in case the teeth are desired to be set in that position.

In case the washer is dispensed with, and the wheel remains in one place, the farmer wishing to make a change of the quantity of grain to suit his different soils, he loosens the bolts at W, Fig. 2, raises the regulators P (on either side of the machine) one notch (or more should he wish a greater change than one fourth) and again secures them, loosens the pin (or other fastening) through the pinion and shaft, moves the pinion until it gears into one of the several wheels upon the hub, as desired, again inserts the pin and the changs is made, " arithmetically."

The principal difference existing between this and all other drills, consists in the form of the grain cylinders which are simple and effective, being cast with longitudinal grooves which are curved where they enter the grain, and setting close to the box in which they run prevents any grain from passing through which is not forced through by the lips, or feeders, that run in the grain, there is also connected with the principal of these cylinders, multiplying wheels or hubs arranged on both sides of the machine so that the pinions (which are attached to the grain cylinder shaft) may be shifted from wheel to wheel or from one series of cog work to another, thus increasing the motion of the grain cylinders and of course increasing the quantity of grain distributed. The ease with which it is shifted to regulate the quantity of grain adapts it to the use for which it is intended. I am aware however that driving wheels have been attached to the ends of the axletree for the purpose of driving grain cylinders, and do not wish or intend to claim as new, the arrangement of driving wheels (abstractly considered) on each or either end of the axletree, as mere driving wheels, but What I do claim as my invention and desire to secure by Letters Patent is—

I claim the peculiarly formed curved lips, or feeders, and longitudinal grooves, or channels, so constructed and tightly fitted to the cast box L, as to prevent any grain from passing into the chamber except what is forced through the grooves by the lips or feeders, substantially as set forth.

In testimony whereof I have signed my name before two subscribing witnesses.

IRA REYNOLDS.

Witnesses:
W. G. COFFIN,
SAML. EWING.